US006487720B1

(12) United States Patent
Ohishi

(10) Patent No.: US 6,487,720 B1
(45) Date of Patent: *Nov. 26, 2002

(54) APPARATUS FOR RECEIVING DIGITAL BROADCAST SIGNAL AND APPARATUS FOR RECORDING AND REPRODUCING DIGITAL BROADCAST INFORMATION INCLUDED IN THE DIGITAL BROADCAST SIGNAL

(75) Inventor: Takeo Ohishi, Yokohama (JP)

(73) Assignee: Victor Company of Japan, Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/181,514

(22) Filed: Oct. 28, 1998

(30) Foreign Application Priority Data

Oct. 29, 1997 (JP) .............................................. 9-312592

(51) Int. Cl.[7] .......................... H04N 7/10; H04N 7/173
(52) U.S. Cl. ........................... 725/31; 725/25; 380/210; 380/240
(58) Field of Search ......................... 348/10, 725, 726, 348/727, 728, 705, 706; 455/6.2, 3.2; 370/522, 486, 487, 490; 380/10, 21; 386/46, 52, 64; 725/21–31

(56) References Cited

U.S. PATENT DOCUMENTS

| | | | | |
|---|---|---|---|---|
| 5,216,552 A | * | 6/1993 | Dunlap et al. | 386/96 |
| 5,488,659 A | * | 1/1996 | Milani | 380/15 |
| 5,600,378 A | | 2/1997 | Wasilewski | |
| 5,710,815 A | * | 1/1998 | Ming et al. | 380/20 |
| 5,715,014 A | * | 2/1998 | Perkins et al. | 348/565 |
| 5,774,548 A | * | 6/1998 | Bando et al. | 380/9 |
| 5,852,290 A | * | 12/1998 | Chaney | 235/492 |
| 5,977,962 A | * | 11/1999 | Chapman et al. | 345/327 |

FOREIGN PATENT DOCUMENTS

| | | |
|---|---|---|
| EP | 0740478 | 10/1996 |
| EP | 0782332 | 7/1997 |
| JP | 08340514 A | 12/1996 |

\* cited by examiner

*Primary Examiner*—Andrew Faile
*Assistant Examiner*—Reuben M. Brown
(74) *Attorney, Agent, or Firm*—Anderson Kill & Olick; Eugene Lieberstein; Michael N. Meller

(57) ABSTRACT

When a received broadcast signal is received in a digital broadcast signal receiving apparatus, an entitlement management message EMM representing broadcast-watching enabling information is extracted from the received digital broadcast signal in an EMM extracting unit regardless of any operation. An extracted digital broadcast signal already descrambled in a preceding step is recorded in a recording unit. When a user selects a reproducing operation in a current step, particular digital broadcast information indicating a particular television program is extracted from the extracted digital broadcast signal in a packet extracting unit. Therefore, the particular television program can be reproduced. When a user selects a receiving operation in the current step, pieces of digital broadcast information indicating television programs are extracted from the received digital broadcast signal in the packet extracting unit and are descrambled according to the message EMM, and the pieces of digital broadcast information are recorded as an extracted digital broadcast signal of the current step in the recording unit. Accordingly, because the message EMM is extracted regardless of any operation, the pieces of digital broadcast information indicating television programs can be reliably extracted from the digital broadcast signal in the receiving operation.

20 Claims, 6 Drawing Sheets

FIG. 3
PRIOR ART

ECM

| CONTENTS | THE NUMBER OF BITS |
|---|---|
| HEADER | 16 |
| TYPE IDENTIFIER | 8 |
| PROTOCOL NUMBER | 4 |
| EXTENSION (1) | 8 |
| STATION IDENTIFYING CODE | 8 |
| WORK KEY IDENTIFIER | 2 |
| DIVISION | 2 |
| SERVICE TYPE | 9 |
| TELEVISION PROGRAM CLASSIFICATION | 4 |
| SCRAMBLE KEY Ks | 32 |
| TELEVISION PROGRAM NUMBER | 12 |
| REGISTRATION JUDGING TYPE | 2 |
| REFERENCE REGISTRATION CODE | 12 |
| PAYMENT PER PROGRAM VIEWING | 13 |
| SCRAMBLE EFFECT CONTROL | 9 |
| DATE AND TIME | 27 |
| PROGRAM INFORMATION RENEWAL | 1 |
| EXTENSION (2) | 17 |
| FALSIFICATION DETECTION | 10 |
| CHECK BITS | 82 |

FIG. 4
PRIOR ART

EMM

| CONTENTS | THE NUMBER OF BITS |
|---|---|
| HEADER | 16 |
| TYPE IDENTIFIER | 8 |
| PROTOCOL NUMBER | 4 |
| EXTENSION (1) | 2 |
| DECODER IDENTIFICATION NUMBER | 32 |
| DIVISION | 2 |
| CONTRACT SERVICE | 9 |
| WORK KEY Kw | 56 |
| WORK KEY IDENTIFICATION NUMBER | 2 |
| THE TERM OF VALIDITY | 11 |
| STATION IDENTIFICATION CODE | 8 |
| CONTRACT TYPE | 4 |
| CONTRACT REGISTRATION CODE | 12 |
| PREPAYMENT | 8 |
| INDIVIDUAL INFORMATION NUMBER | 7 |
| RENEWAL NUMBER | 3 |
| EXTENSION (2) | 2 |
| FALSIFICATION DETECTION | 20 |
| CHECK BITS | 82 |

APPARATUS FOR RECEIVING DIGITAL BROADCAST SIGNAL AND APPARATUS FOR RECORDING AND REPRODUCING DIGITAL BROADCAST INFORMATION INCLUDED IN THE DIGITAL BROADCAST SIGNAL

BACKGROUND OF THE INVENTION

1. Field of the Invention

The present invention relates to a digital broadcast signal receiving apparatus for receiving a digital broadcast signal including both watch-unable digital broadcast information indicating a television program and broadcast-watching enabling information, which enables a user to watch the television program, from a sender, converting the watch-unable digital broadcast information into watch-enabled digital broadcast information indicating the television program and outputting the watch-enabled digital broadcast information. Also, the present invention relates to a digital information recording and reproducing apparatus in which the watch-unable digital broadcast information of the digital broadcast signal transmitted from the sender is converted into the watch-enabled digital broadcast information and the watch-enabled digital broadcast information is reproduced.

2. Description of the Related Art

2.1. Previously Proposed Art

Data, information and keys generally included in a digital broadcast signal are described with reference to FIGS. 1 and 2.

FIG. 1 is a block diagram of a digital broadcast sending system from which a multiplexed digital broadcast signal including both pieces of digital broadcast information indicating television programs and broadcast-watching enabling information is transmitted to a plurality of receivers in the form of a transport stream according to a Moving Picture Experts Group 2 (MPEG 2).

As shown in FIG. 1, a digital broadcast sending system 100 of a sender comprises:

a plurality of signal processing units 101a, 101b, ------, arranged in parallel to each other, for respectively producing digital broadcast information including audio/video data of a television program;

an enciphering unit 121 for enciphering a work key Kw used to encipher attribute information of the television programs and enciphering contract information of each receiver (or viewer); and a multiplexing unit 122 for performing the time-division multiplexing for the pieces of digital broadcast information produced in the signal processing units 101a, 101b, ------, the work key Kw and the contract information enciphered in the enciphering unit 121, an electronic program guide (EPG) prepared in a broadcast scheduler (not shown) and specific information added by the sender and outputting packets of multiplexed digital broadcast signal.

In each signal processing unit 101 of this digital broadcast sending system 100, video/audio data of a television program P1, P2, ------, or Pk are compressed in compression units 102 according to a compression format of the MPEG 2, the compressed video/audio data of the television program P1 are divided into a series of packetized elementary stream (PES) packets in a PES packet unit 103. Also, character data indicating characters to be displayed in a teletext broadcasting is divided into another series of PES packets in the PES packet unit 103, and the time-division multiplexing is performed for the PES packets.

Thereafter, because the sender desires that the television programs P1, P2, ------, and Pk are watched by a plurality of limited viewers who contract with the sender to watch television programs transmitted by the sender, information of the PES packets is scrambled in a scrambling unit 104 by using a scramble key Ks.

Thereafter, as shown in FIG. 2, each scrambled PES packet is divided into a plurality of transport stream (TS) packets in a TS packet unit 105. Each TS packet has a data length of 188 bytes and is composed of a TS packet header of 4 bytes and an adaptation field and/or a payload of 184 bytes, and each scrambled PES packet is inserted into regions of the payloads of the TS packets. Each television program inserted into the TS packets is identified by a packet identification PID written in the TS packet header of each TS packet.

Also, the scramble key Ks and attribute information of the television program P1, P2, ------, or Pk are enciphered according to a work key Kw in an enciphering unit 106 to produce an entitlement control message ECM, and the entitlement control message ECM is divided into a plurality of TS packets in the TS packet unit 105. The entitlement control message ECM indicates information common to all receivers, and an example of the message ECM is shown in FIG. 3.

In the enciphering unit 121, the work key Kw and contract information of each receiver are enciphered to produce an entitlement management message EMM, and the entitlement management message EMM is divided into a plurality of TS packets. The message EMM is identified by a prescribed packet identifier arranged in each TS packet header. The entitlement management message EMM indicates individual information corresponding to each receiver, and an example of the message EMM is shown in FIG. 4.

Thereafter, the time-division multiplexing is performed in the multiplexing unit 122 for the pieces of digital broadcast information arranged in the TS packets in the signal processing units 110a, 101b, ------, and 101k and the entitlement management message EMM arranged in the TS packets, and the time-division multiplexed TS packets are output from the system 100 to a digital information recording and reproducing apparatus of each receiver as TS packets of a multiplexed digital broadcast signal.

In addition to the entitlement management message EMM, the sender can send an electronic program guide (EPG) prepared in a broadcast scheduler (not shown) and specific information added by the sender with the TS packets of the multiplexed digital broadcast signal. In this case, the electronic program guide and the specific information added by the sender are inserted into a series of TS packets defined by the sender. For example, in cases where the sender desires to change an algorithm of an enciphering method to a new algorithm and to send television programs enciphered according to the new algorithm to a group of limited receivers, control software installed in a receiving apparatus of each limited receiver is rewritten to new control software according to the specific information added by the sender to decipher the enciphered television programs received by the limited receiver according to the new control software. In this case, because the entitlement management message EMM and the specific information added by the sender are correctly processed in receiving apparatuses of a plurality of limited receivers, a group of limited receivers can watch television programs sent by the sender. Therefore, the entitlement management message EMM and the specific information added by the sender are called "broadcast-watching enabling information" in this specification.

Because updated broadcast-watching enabling information included in the packets of the multiplexed digital broadcast signal is intermittently sent to a group of limited receivers who formally contract with a television program sender, the broadcast-watching enabling information can be used by the group of limited receivers. Therefore, in cases where a contract of a receiver with a sender is, for example, canceled because the receiver does not pay the sender for a charge, updated broadcast-watching enabling information included in the packets of the multiplexed digital broadcast signal is not sent to the receiver any more. In this case, because the updated broadcast-watching enabling information is required to correctly decipher television programs transmitted from the sender, the receiver cannot watch any television program.

Also, even though a receiver formally contract with a sender, in cases where particular updated broadcast-watching enabling information transmitted from the sender cannot be received by the receiver because of a stoppage of electric power supplied to a receiver's apparatus, the receiver cannot watch any television program transmitted from the sender. In this case, the receiver informs the sender that the receiver cannot watch any television program transmitted from the sender, and the sender again transmit the particular updated broadcast-watching enabling information to the receiver.

Next, the receiving, recording and reproduction of the multiplexed digital broadcast signal transmitted from the digital broadcast sending system 100 through a broadcasting satellite is described.

FIG. 5 is a block diagram of a conventional digital information recording and reproducing apparatus in which a conventional digital satellite broadcasting receiving apparatus is arranged. This conventional digital information recording and reproducing apparatus is disclosed in the Published Unexamined Japanese Patent Application No. H8-340514 (1996).

As shown in FIG. 5, a conventional digital information recording and reproducing apparatus 200 of a user is composed of:

an antenna 201 for receiving the multiplexed digital broadcast signal in which the pieces of digital broadcast information including the entitlement control messages ECM, the entitlement management message EMM, the electronic program guide and the specific information added by the sender are arranged;

a front end 202 for performing a frequency conversion, a demodulation and an error correction for the multiplexed digital broadcast signal received in the antenna 201 and outputting the processed signal as a received digital broadcast signal;

a switch 203 for selecting the received digital broadcast signal output from the front end 202 in a direct reproducing operation and a receiving operation and selecting a readout digital broadcast signal read out from a recording medium in a reproducing operation;

a demultiplexer 204 for extracting the entitlement management message EMM representing the broadcast-watching enabling information, the pieces of digital broadcast information of the television programs and the entitlement control messages ECM from the received digital broadcast signal selected by the switch 203 in the direct reproducing operation and the receiving operation, deciphering the entitlement management message EMM and the entitlement control messages ECM in the direct reproducing operation and the receiving operation, extracting each piece of digital broadcast information from the received digital broadcast signal, performing a descrambling processing for each digital broadcast information by using the entitlement management message EMM and the corresponding entitlement control message ECM in the direct reproducing operation and the receiving operation to obtain the descrambled digital broadcast information as extracted digital broadcast information for each television program, and extracting particular digital broadcast information corresponding to one or more particular television programs desired by the user from the readout digital broadcast signal selected by the switch 203 as particular extracted digital broadcast information in the reproducing operation;

a recording and reading unit 205 for recording, in the receiving operation, the pieces of extracted digital broadcast information obtained in the demultiplexer 204 in a recording medium such as a magnetic tape and reading out the pieces of extracted digital broadcast information as the readout digital broadcast signal to be input to the demultiplexer 204 through the switch 203 in the reproducing operation;

a video/audio decoder 206 for expanding the particular extracted digital broadcast information output from the demultiplexer 204 and performing a digital-analog conversion for the particular extracted digital broadcast information to obtain an analog video signal and an analog audio signal indicating each particular television program desired by the user; and an NTSC/PAL encoder 207 for converting the analog video signal into an NTSC (National Television System Committee) signal adopted in Japan and United State of America as a standard television signal or a PAL (phase alternating by line) signal adopted in Great Britain and Germany and outputting the analog audio signal and the analog video signal converted into the NTSC signal or the PAL signal.

A conventional digital satellite broadcasting receiving apparatus is composed of the front end 202, the switch 203 and the demultiplexer 204.

In the above configuration, an operation of the apparatus 200 is described.

The packets of the pieces of digital broadcast information, the entitlement control messages ECM, the entitlement management message EMM, the electronic program guide and the sender added information transmitted from the digital broadcast sending system 100 are received in the antenna 201, and a frequency conversion, a demodulation and an error correction are performed for the received signals, messages, guide and information in the front end 202. Therefore, a received digital broadcast signal of a base band is obtained. In the received digital broadcast signal, pieces of digital broadcast information indicating a plurality of television programs are multiplexed in time-division.

When a user selects a direct reproducing operation, the front end 202 is connected with the demultiplexer 204 through a first terminal T1 of the switch 203, the received digital broadcast signal is transmitted to the demultiplexer 204 through the switch 203. In the demultiplexer 204, the entitlement management message EMM representing the broadcast-watching enabling information, the pieces of digital broadcast information of the television programs and the entitlement control messages ECM are extracted from the received digital broadcast signal, then the entitlement management message EMM and the entitlement control messages ECM are deciphered. Each piece of digital broadcast information is extracted from the received digital broadcast signal, and a descrambling processing is performed for each digital broadcast information by using the entitlement management message EMM and the corresponding entitlement control message ECM to obtain the descrambled digital broadcast information as extracted digital broadcast information for each television program.

Thereafter, pieces of extracted digital broadcast information indicating one or more television programs are expanded because the extracted digital broadcast information are compressed in the digital broadcast sending system 100, and a digital-analog conversion for the extracted digital broadcast information is performed to obtain an analog video signal and an analog audio signal indicating the television programs. The analog video signal and the analog audio signal are transmitted to the NTSC/PAL encoder 207.

In the NTSC/PAL encoder 207, the analog video signal is converted into an NTSC signal or a PAL signal, and the analog audio signal and the analog video signal converted into the NTSC signal or the PAL signal are output to a video/audio reproducing unit (not shown).

Therefore, the user can entertain one or more television programs displayed on an image screen by reproducing the analog video/audio signals in the direct reproducing operation.

Next, when a user selects a receiving operation, the front end 202 is connected with the demultiplexer 204 through the first terminal T1 of the switch 203 in the same manner as in the direct reproducing operation, the received digital broadcast signal is transmitted to the demultiplexer 204 through the switch 203, and extracted digital broadcast information is obtained in the demultiplexer 204 for each television program in the same manner as in the direct reproducing operation. The pieces of extracted digital broadcast information are recorded in the recording and reading unit 205.

Thereafter, when the user desires to reproduce one or more particular television programs recorded in the recording and reading unit 205, the recording and reading unit 205 is connected with the demultiplexer 204 through a second terminal T2 of the switch 203, and a reproducing operation is started. In the reproducing operation, the pieces of extracted digital broadcast information are read out from the recording and reading unit 205 as a readout digital broadcast signal, and particular digital broadcast information corresponding to the particular television programs is extracted in the demultiplexer 204 as particular extracted digital broadcast information from the readout digital broadcast signal. Thereafter, particular digital video/audio signals of the particular extracted digital broadcast information are output from the demultiplexer 204 to the video/audio decoder 206.

In the video/audio decoder 206, because the particular digital video/audio signals of the particular extracted digital broadcast information are compressed in the digital broadcast sending system 100, the particular digital video/audio signals are expanded, and a digital-analog conversion for the particular extracted digital broadcast information is performed to obtain an analog video signal and an analog audio signal indicating the particular television programs desired by the user. The analog video signal and the analog audio signal are transmitted to the NTSC/PAL encoder 207, and the analog audio signal and the analog video signal converted into an NTSC signal or a PAL signal are output from the NTSC/PAL encoder 207 to the video/audio reproducing unit (not shown) in the same manner as in the direct reproducing operation.

Therefore, the user can entertain one or more particular television programs displayed on an image screen by reproducing the analog video/audio signals.

2.2. Problems to Be Solved by the Invention

However, because the reproducing operation for the read-out digital broadcast signal read out from the recording and reading unit 205 is performed in the demultiplexer 204 in which the receiving operation for the received digital broadcast signal transmitted from the front end 202 is performed, the reproducing operation and the receiving operation cannot be simultaneously performed. Therefore, in cases where the broadcast-watching enabling information represented by the entitlement management message EMM of the received digital broadcast signal is transmitted from the digital broadcast sending system 100 of a broadcasting station during the reproducing operation for the readout digital broadcast signal read out from the recording and reading unit 205, the broadcast-watching enabling information capable to be detected in the receiving operation is not detected in the demultiplexer 204 because the reproducing operation is performed in the demultiplexer 204. In this case, even though the user formally contracts with the sender, there is a problem that the user cannot reproduce any received digital broadcast signal transmitted from the broadcasting station after the user fails the detection of the broadcast-watching enabling information represented by the entitlement management message EMM.

SUMMARY OF THE INVENTION

An object of the present invention is to provide, with due consideration to the drawbacks of such a conventional digital broadcast signal receiving apparatus and a conventional digital information recording and reproducing apparatus, a digital broadcast signal receiving apparatus and a digital information recording and reproducing apparatus in which broadcast-watching enabling information is detected even though a reproducing operation for digital broadcast information read out from a recording medium is continued.

The object is achieved by the provision of a digital broadcast signal receiving apparatus, comprising:

selecting means for selecting an extracted digital broadcast signal transmitted from an outside in a first operation of a current step and selecting a digital broadcast signal, in which pieces of watch-unable digital broadcast information and broadcast-watching enabling information are included, transmitted from a signal sender in a second operation of the current step, the extracted digital broadcast signal being composed of pieces of watch-enabled digital broadcast information obtained in a preceding step;

broadcast-watching enabling information extracting means, always set to a condition for receiving the digital broadcast signal from the signal sender, for receiving the digital broadcast signal from the signal sender and extracting the broadcast-watching enabling information from the digital broadcast signal in the current step regardless of whether the digital broadcast signal is selected by the selecting means in the second operation or the extracted digital broadcast signal is selected by the selecting means in the first operation; and digital broadcast information converting means for receiving the extracted digital broadcast signal selected by the selecting means in the first operation, extracting a piece of particular watch-enabled digital broadcast information from the extracted digital broadcast signal in the first operation, outputting the particular watch-enabled digital broadcast information in the first operation, receiving the digital broadcast signal selected by the selecting means in the second operation, extracting the pieces of watch-unable digital broadcast information from the digital broadcast signal selected by the selecting means in the second operation, converting each piece of watch-unable digital broadcast information into watch-enabled digital broadcast information of the current step according to the broadcast-watching enabling information extracted by the broadcast-watching enabling information extracting means, and outputting the pieces of watch-enabled digital broadcast information of the current step to the outside.

In the above configuration, because the broadcast-watching enabling information extracting means is always set to a condition for receiving the digital broadcast signal from the signal sender, a digital broadcast signal transmitted from the signal sender is received by the broadcast-watching enabling information extracting means regardless of whether a user adopts a first operation or a second operation, and broadcast-watching enabling information is extracted from the digital broadcast signal. The broadcast-watching enabling information is sent to the digital broadcast information converting means.

When a first operation is adopted by a user because the user desires the outputting of a piece of particular watch-enabled digital broadcast information already obtained in a preceding step, the extracted digital broadcast signal obtained in the preceding step is transmitted from the outside and is selected by the selecting means, and the extracted digital broadcast signal is transmitted to the digital broadcast information converting means. In the digital broadcast information converting means, the particular watch-enabled digital broadcast information is extracted from the extracted digital broadcast signal and is output.

Thereafter, when a second operation is adopted by a user, the digital broadcast signal transmitted from the signal sender is selected by the selecting means, and the digital broadcast signal is transmitted to the digital broadcast information converting means. In the digital broadcast information converting means, pieces of watch-unable digital broadcast information are extracted from the digital broadcast signal, and each piece of watch-unable digital broadcast information is converted into watch-enabled digital broadcast information of a current step according to the broadcast-watching enabling information. The pieces of watch-enabled digital broadcast information is output to the outside as an extracted digital broadcast signal of the current step.

Accordingly, because the broadcast-watching enabling information extracting means is always set to a condition for receiving the digital broadcast signal from the signal sender regardless of whether the user adopts a first operation or a second operation, the broadcast-watching enabling information can be reliably extracted from the digital broadcast signal in any operation of the current step by the broadcast-watching enabling information extracting means. Therefore, even though the digital broadcast signal is transmitted to the digital broadcast signal receiving apparatus during the first operation in which the particular watch-enabled digital broadcast information is extracted from the extracted digital broadcast signal by the digital broadcast information converting means, the broadcast-watching enabling information can be extracted from the extracted digital broadcast signal by the broadcast-watching enabling information extracting means, and each piece of watch-unable digital broadcast information of the digital broadcast signal can be converted into watch-enabled digital broadcast information in the second operation by the digital broadcast information converting means according to the broadcast-watching enabling information.

The object is also achieved by the provision of a digital information recording and reproducing apparatus, comprising:

digital broadcast information recording and reading means for recording pieces of watch-enabled digital broadcast information obtained in a preceding step and reading out the pieces of watch-enabled digital broadcast information as an extracted digital broadcast signal;

selecting means for selecting the extracted digital broadcast signal read out from the digital broadcast information recording and reading means in a reproducing operation of a current step and selecting a digital broadcast signal, in which pieces of watch-unable digital broadcast information and broadcast-watching enabling information are included, transmitted from a signal sender in a receiving operation of the current step;

broadcast-watching enabling information extracting means, always set to a condition for receiving the digital broadcast signal from the signal sender, for receiving the digital broadcast signal from the signal sender and extracting the broadcast-watching enabling information from the digital broadcast signal in the current step regardless of whether the digital broadcast signal is selected by the selecting means in the receiving operation or the extracted digital broadcast signal is selected by the selecting means in the reproducing operation;

digital broadcast information converting means for receiving the extracted digital broadcast signal selected by the selecting means in the reproducing operation, extracting a piece of particular watch-enabled digital broadcast information from the extracted digital broadcast signal in the reproducing operation, outputting the particular watch-enabled digital broadcast information in the reproducing operation, receiving the digital broadcast signal selected by the selecting means in the receiving operation, extracting the pieces of watch-unable digital broadcast information from the digital broadcast signal selected by the selecting means in the receiving operation, converting each piece of watch-unable digital broadcast information into watch-enabled digital broadcast information of the current step according to the broadcast-watching enabling information extracted by the broadcast-watching enabling information extracting means, and outputting the pieces of watch-enabled digital broadcast information of the current step to the digital broadcast information recording and reading means to replace the pieces of watch-enabled digital broadcast information already recorded in the digital broadcast information recording and reading means with the pieces of watch-enabled digital broadcast information of the current step; and digital broadcast information decoding means for decoding the particular watch-enabled digital broadcast information output from the digital broadcast information converting means to obtain an analog broadcast signal and outputting the analog broadcast signal to reproduce the analog broadcast signal.

In the above configuration, when a digital broadcast signal is transmitted from the signal sender, the digital broadcast signal is always received by the broadcast-watching enabling information extracting means regardless of whether a user adopts a reproducing operation or a receiving operation, broadcast-watching enabling information is extracted from the digital broadcast signal, and the broadcast-watching enabling information is sent to the digital broadcast information converting means.

When a reproducing operation is adopted by the user, pieces of watch-enabled digital broadcast information obtained in a preceding step are read out as an extracted digital broadcast signal from the digital broadcast information recording and reading means to the digital broadcast information converting means through the selecting means. In the digital broadcast information converting means, a piece of particular watch-enabled digital broadcast information desired by the user is extracted from the extracted digital broadcast signal of the preceding step. Thereafter, the particular watch-enabled digital broadcast information is decoded to an analog broadcast signal by the digital broadcast information decoding means, and the analog broadcast signal is output to reproduce the analog broadcast signal.

Thereafter, when a receiving operation is adopted by the user, pieces of watch-unable digital broadcast information are extracted from the digital broadcast signal selected by the selecting means, and each piece of watch-unable digital broadcast information is converted into watch-enabled digital broadcast information of a current step according to the broadcast-watching enabling information. The pieces of watch-enabled digital broadcast information is recorded in the digital broadcast information recording and reading means to replace the pieces of watch-enabled digital broadcast information already recorded in the digital broadcast information recording and reading means with the pieces of watch-enabled digital broadcast information of the current step.

Accordingly, because the broadcast-watching enabling information extracting means is always set to a condition for receiving the digital broadcast signal from the signal sender regardless of whether the user adopts the receiving operation or the reproducing operation, even though the digital broadcast signal is transmitted to the digital information recording and reproducing apparatus during the reproducing operation in which the particular watch-enabled digital broadcast information is extracted from the extracted digital broadcast signal by the digital broadcast information converting means, the broadcast-watching enabling information can be reliably extracted from the digital broadcast signal without any failure of the reception of the digital broadcast signal. Therefore, the conversion of watch-unable digital broadcast information into watch-enabled digital broadcast information can be reliably performed according to the broadcast-watching enabling information in the receiving operation, the extraction of particular watch-enabled digital broadcast information from the watch-enabled digital broadcast information can be performed in the reproducing operation, and an analog broadcast signal obtained from the particular watch-enabled digital broadcast information can be output to reproduce the analog broadcast signal.

BRIEF DESCRIPTION OF THE DRAWINGS

The objects, features and advantages of the present invention will be apparent from the following description taken in conjunction with the accompanying drawings, in which:

FIG. 3 shows a configuration of an entitlement control message ECM as an example;

FIG. 4 shows a configuration of an entitlement management message EMM as an example;

DETAILED DESCRIPTION OF THE EMBODIMENTS

Preferred embodiments of a digital broadcast signal receiving apparatus and a digital information recording and reproducing apparatus according to the present invention are described with reference to the drawings.

Figure 1:
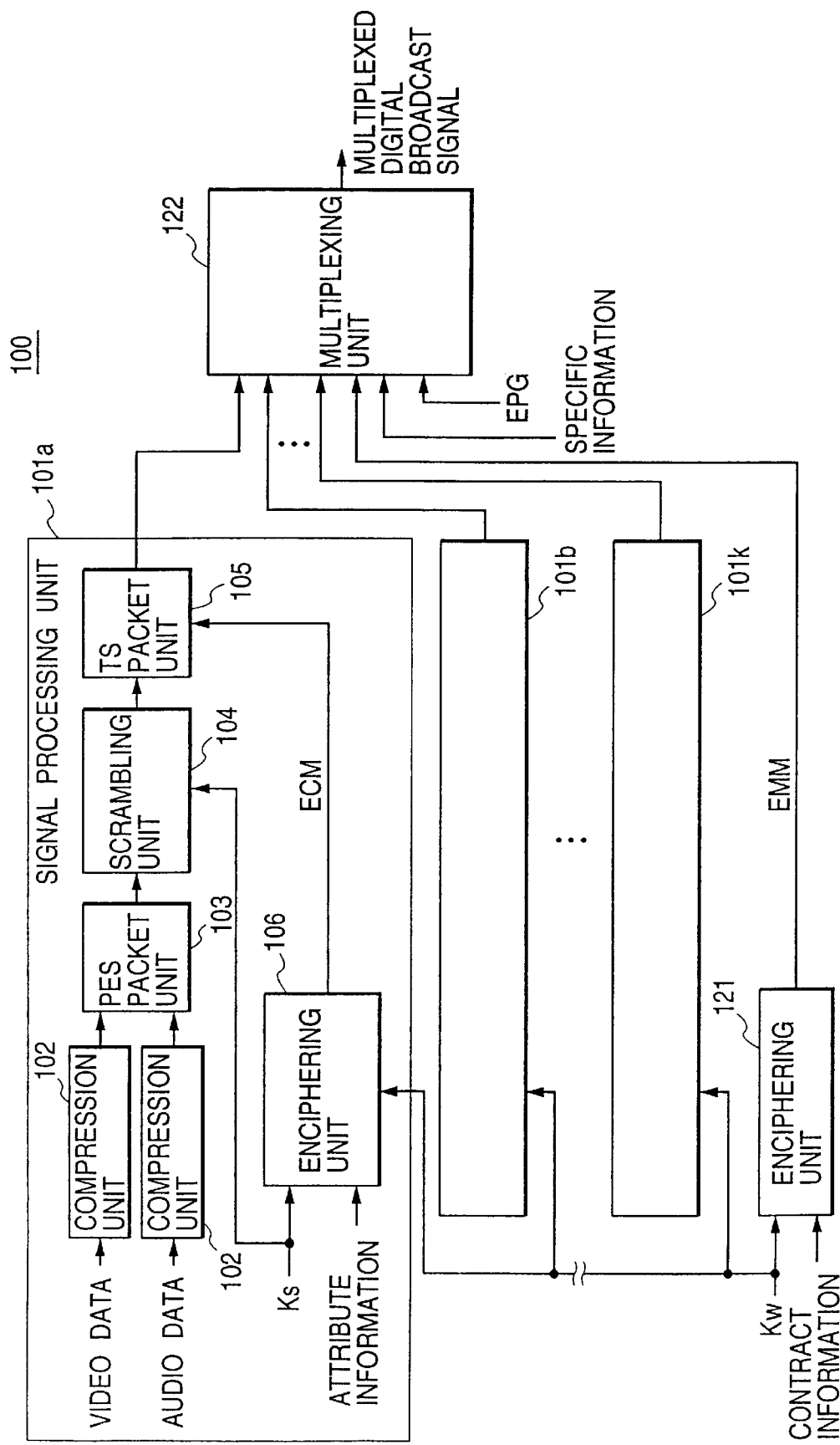
FIG. 1 is a block diagram of a digital broadcast sending system from which a multiplexed digital broadcast signal including both pieces of digital broadcast information indicating television programs and broadcast-watching enabling information is transmitted to a plurality of receivers in the form of a transport stream according to a Moving Picture Experts Group 2 (MPEG 2)
Figure 2:
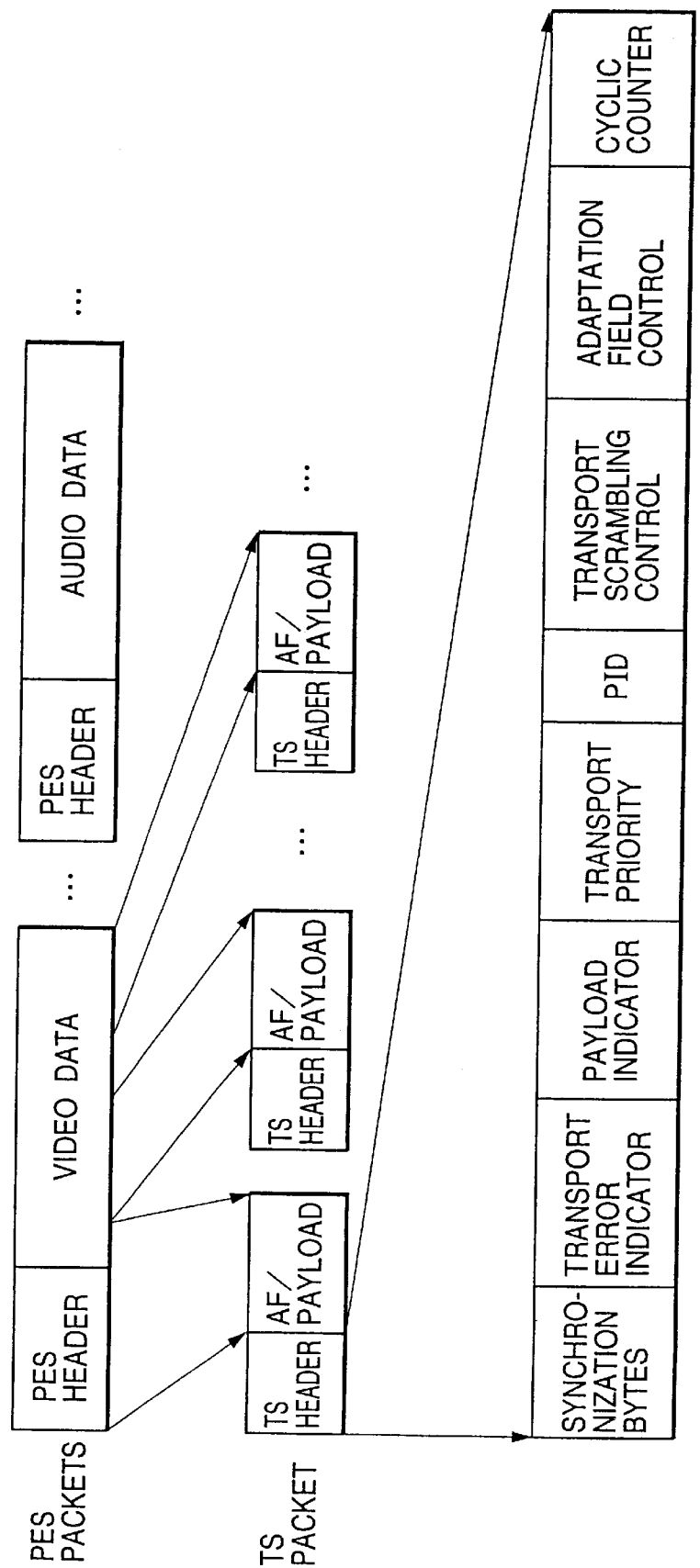
FIG. 2 shows a series of PES packets, in which the pieces of digital broadcast information are arranged, and a series of TS packets obtained by dividing each PES packet.
Figure 5:
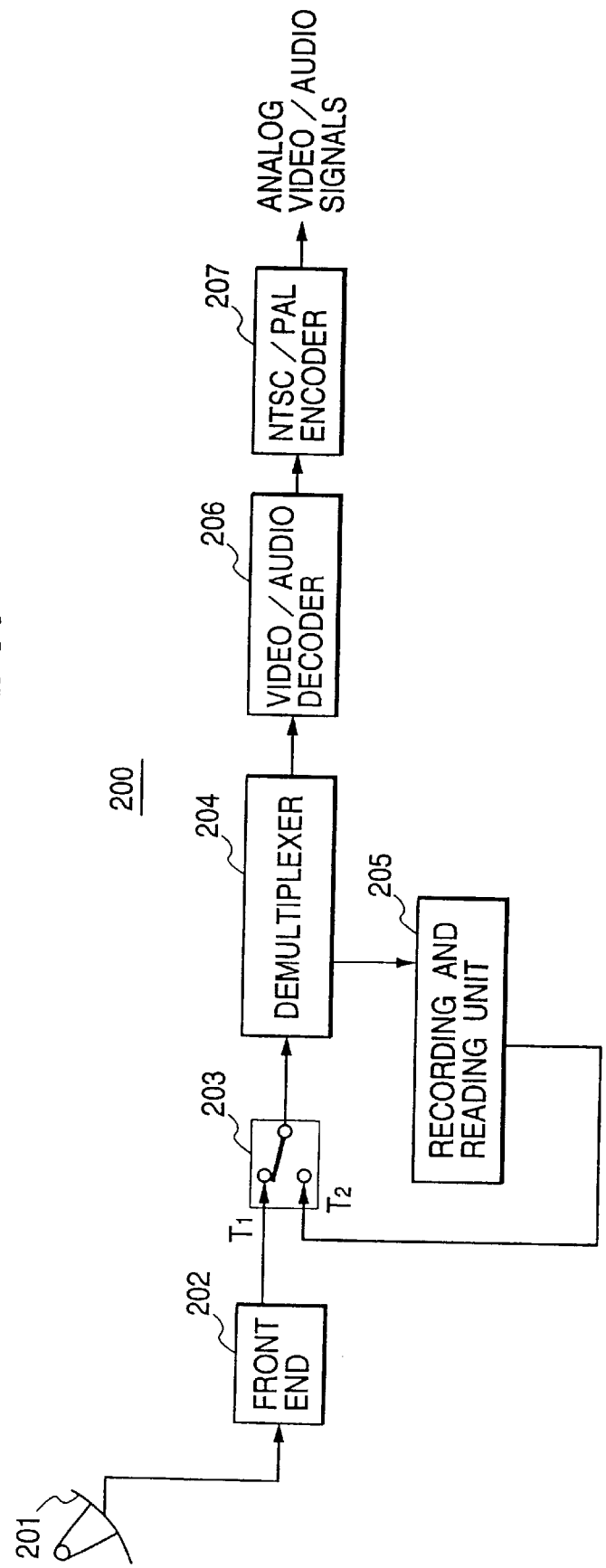
FIG. 5 is a block diagram of a conventional digital information recording and reproducing apparatus in which a conventional digital satellite broadcasting receiving apparatus is arranged.
Figure 6:
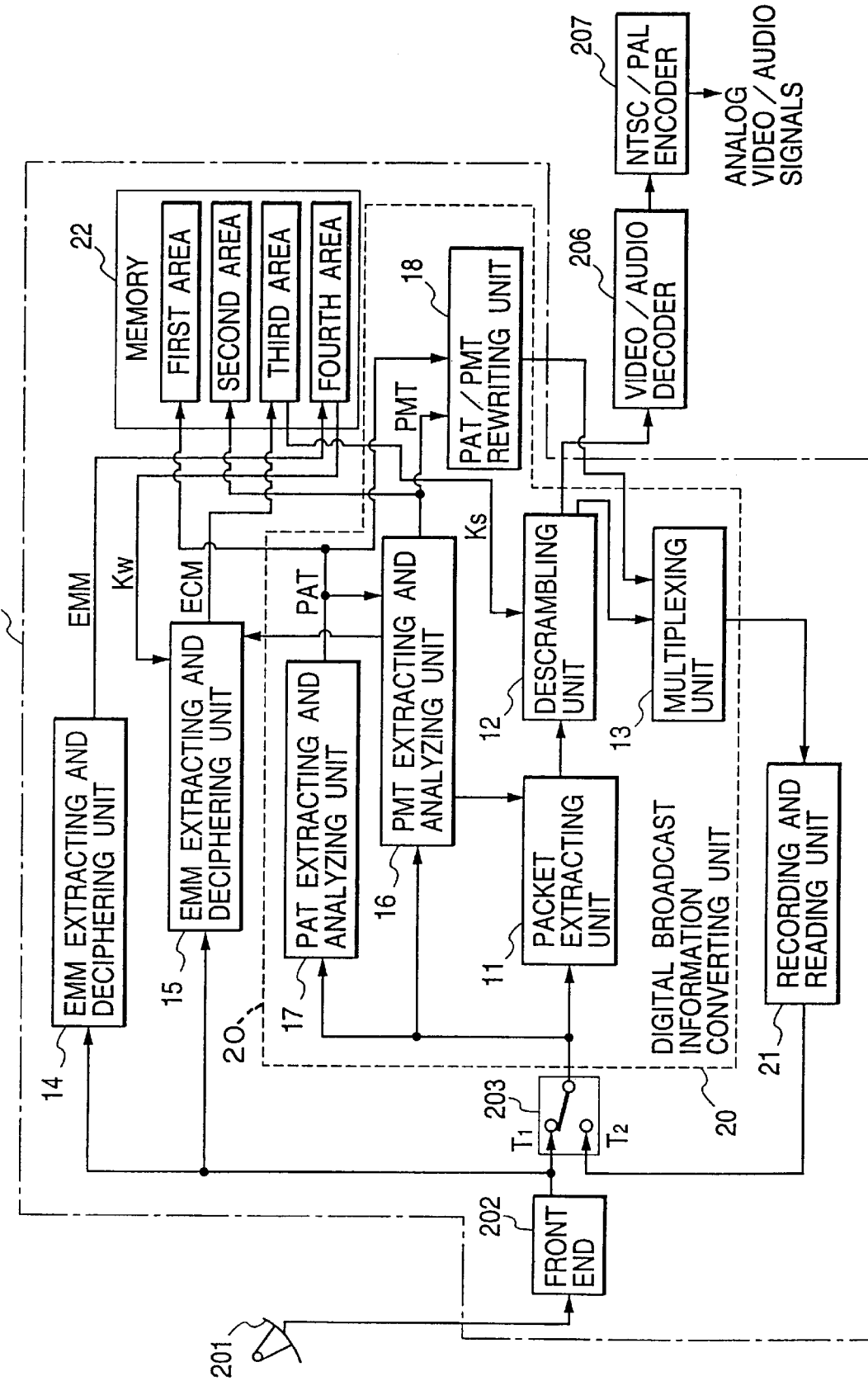
FIG. 6 is a block diagram of a digital information recording and reproducing apparatus, in which a digital broadcast signal receiving apparatus is arranged, according to an embodiment of the present invention.

FIG. 6 is a block diagram of a digital information recording and reproducing apparatus, in which a digital broadcast signal receiving apparatus is arranged, according to an embodiment of the present invention.

As shown in FIG. 6, a digital information recording and reproducing apparatus 10 of a user comprises: the antenna 201; the front end 202; the switch 203;

an EMM extracting and deciphering unit 14, directly connected with the front end 202, for receiving packets of the received digital broadcast signal transmitted from the front end 202, extracting packets of the entitlement management message EMM, of which packet identifiers are set to a specific value, from the packets of the received digital broadcast signal and deciphering the entitlement management message EMM by using a master key Km stored in advance in the apparatus 10, the packets of the entitlement management message EMM being included in the packets of the received digital broadcast signal on condition that the user formally contracts with the sender of the digital broadcast sending system 100;

an ECM extracting and deciphering unit 15 for receiving packets of the received digital broadcast signal transmitted from the front end 202, extracting packets of the entitlement control messages ECM from the packets of the received digital broadcast signal according to information indicating packet identifiers of the entitlement control messages ECM, deciphering each entitlement control message ECM by using the work key Kw of the entitlement management message EMM deciphered in the EMM extracting and deciphering unit 14 and obtaining the scramble key Ks from each entitlement control message ECM;

a digital broadcast information converting unit 20 for receiving packets of the received digital broadcast signal transmitted from the front end 202 through the switch 203 in a direct reproducing operation and a receiving operation, extracting information (a program map table PMT in which packet identifiers of packets corresponding to the television programs and packet identifiers of packets of each entitlement control message ECM are listed and a program association table PAT in which packet identifiers of packets of the program map table PMT are listed) indicating the configuration of television programs from the received digital broadcast signal, extracting the pieces of digital broadcast information of the television programs from the received digital broadcast signal, converting each piece of digital broadcast information into extracted digital broadcast information by descrambling the digital broadcast information with the scramble key Ks of the corresponding entitlement control message ECM, rewriting the program association table PAT and the program map table PMT to obtain rewritten tables PAT and PMT indicating the configuration information of one television program for each television program, outputting the extracted digital broadcast information for each television program in the direct reproducing operation, outputting a set of the extracted digital broadcast information and the corresponding rewritten tables PAT and PMT for each television program in the receiving operation, and extracting one or more pieces of particular digital broadcast information corresponding to one or more particular television programs desired by the user from the readout digital broadcast signal selected by the switch 203 as one or more pieces of particular extracted digital broadcast information;

a recording and reading unit 21 for recording, in the receiving operation, the set of the extracted digital broadcast information and the rewritten tables PAT and PMT output from the digital broadcast information converting unit 20 in a recording medium such as a magnetic tape for each television program and reading out the sets of the pieces of extracted digital broadcast information and the rewritten tables PAT and PMT as the readout digital broadcast signal to the switch 203;

a memory 22, having first to fourth areas, for storing information (a program map table PMT and a program association table PAT) extracted in the digital broadcast information converting unit 20, storing the entitlement control messages ECM deciphered in the ECM extracting and deciphering unit 15 in the third area, and storing the entitlement management message EMM deciphered in the EMM extracting and deciphering unit 14 in the fourth area;

the video/audio decoder 206 for expanding the extracted digital broadcast information output from the digital broadcast information converting unit 20 and performing a digital-analog conversion for the extracted digital broadcast information to obtain an analog video signal and an analog audio signal indicating each particular television program desired by the user; and the NTSC/PAL encoder 207.

A digital broadcast signal receiving apparatus is composed of the front end 202, the EMM extracting and deciphering unit 14, the ECM extracting and deciphering unit 15, the switch 203, the digital broadcast information converting unit 20 and the recording and reading unit 21.

The digital broadcast information converting unit 20 comprises:.

a PAT extracting and analyzing unit 17 for receiving the packets of the received digital broadcast signal from the front end 202 through the switch 203 (the direct reproducing operation and the receiving operation) or the packets of the readout digital broadcast signal from the recording and reading unit 21 through the switch 203 (the reproducing operation), extracting packets of the program association table PAT, of which packet identifiers are set to a prescribed value, from the packets of the received digital broadcast signal, extracting packets of rewritten program association table PAT, of which packet identifiers are set to a prescribed value, from the packets of the readout digital broadcast signal, analyzing the program association table PAT or the rewritten program association table PAT to identify the packet identifiers of the packets of the program map table PMT, storing the program association table PAT in the first area of the memory 22, and outputting PAT information indicating the packet identifiers of the packets of the program map table PMT;

a PMT extracting and analyzing unit 16 for receiving the packets of the received digital broadcast signal from the front end 202 through the switch 203 (the direct reproducing operation and the receiving operation) or the packets of the readout digital broadcast signal from the recording and reading unit 21 through the switch 203 (the reproducing operation), extracting the packets of the program map table PMT from the packets of the received digital broadcast signal or the packets of the readout digital broadcast signal according to the PAT information output from the PAT extracting and analyzing unit 17, analyzing the program map table PMT to identify packet identifiers of packets of one television program for each television program and to identify packet identifiers of packets of the entitlement control message ECM (the direct reproducing operation and the receiving operation), analyzing the program map table PMT to identify packet identifiers of packets of each particular television program desired by the user (the reproducing operation), outputting PMT information indicating the packet identifiers of the packets of the entitlement control message ECM to the ECM extracting and deciphering unit 15, storing the program map table PMT in the second area of the memory 22, outputting program information indicating the packet identifiers of the packets of one television program for each television program (the direct reproducing operation and the receiving operation), and outputting program information indicating the packet identifiers of the packets of each particular television program (the reproducing operation); a PAT/PMT rewriting unit 18 for rewriting the program map table PMT extracted in the PMT extracting and analyzing unit 16 to a rewritten program map table PMT, in which a plurality of packet identifiers of packets of one television program are listed, for each television program and rewriting the program association table PAT extracted in the PAT extracting and analyzing unit 17 to a rewritten program association table PAT, in which a plurality of packet identifiers of packets of one rewritten program map table PMT are listed, for each rewritten program map table PMT (the receiving operation);

a packet extracting unit 11 for extracting the packets of one piece of digital broadcast information corresponding to one television program from the packets of the received digital broadcast signal according to the program information output from the PMT extracting and analyzing unit 16 for each television program (the direct reproducing operation and the receiving operation), and extracting the packets of particular digital broadcast information corresponding to each particular television program from the packets of the readout digital broadcast signal according to the program information output from the PMT extracting and analyzing unit 16 (the reproducing operation);

a descrambling unit 12 for descrambling the packets of each piece of digital broadcast information extracted in the packet extracting unit 11 by using the scramble key Ks of the entitlement control message ECM extracted in the ECM extracting and deciphering unit 15 to obtain the descrambled digital broadcast information as extracted digital broadcast information for each television program (the direct reproducing operation and the receiving operation); and a multiplexing unit 13 for multiplexing each extracted digital broadcast information obtained in the descrambling unit 12 and the rewritten program association table PAT and the rewritten program map table PMT obtained in the PAT/PMT rewriting unit 18 to obtain multiplexed digital broadcast information for each television program (the receiving operation), each multiplexed digital broadcast information being recorded in the recording and reading unit 205.

In the above configuration, an operation of the digital information recording and reproducing apparatus 10 is described.

A received digital broadcast signal of a base band is obtained in the front end 202 in the same manner as in the conventional apparatus 200. In the received digital broadcast signal, pieces of digital broadcast information indicating a plurality of television programs and the entitlement management message EMM representing the broadcast-watching enabling information are multiplexed in time-division, and one entitlement control message ECM is included in each digital broadcast information. Also, packet identifiers of the entitlement management message EMM are set to a specific value, so that the entitlement management message EMM can be easily extracted from the received digital broadcast signal.

The received digital broadcast signal is basically sent to the switch 203, the packet extracting unit 11, the descrambling unit 12, the video/audio decoder 206 and the NTSC/PAL encoder 207 in that order, so that analog video/audio signals indicating each television program are output from the digital information recording and reproducing apparatus 10.

In this embodiment, the received digital broadcast signal is always transmitted to the EMM extracting and deciphering unit 14 and the ECM extracting and deciphering unit 15 regardless of the condition of the switch 203.

In the EMM extracting and deciphering unit 14, packets of the entitlement management message EMM are extracted from the packets of the received digital broadcast signal, and the entitlement management message EMM is deciphered by using a master key Km. The master key Km is stored in advance in the apparatus 10. The entitlement management message EMM is, for example, transmitted from the digital broadcast sending system 100 to the digital information recording and reproducing apparatus 10 of each user every several days or every month, and the entitlement management message EMM including the work key Kw is stored in the fourth area of the memory 22 as an updated entitlement management message EMM each time the entitlement management message EMM is extracted and deciphered.

Accordingly, because the received digital broadcast signal obtained in the front end 202 is directly transmitted to the EMM extracting and deciphering unit 14 without passing the switch 203 in which the connection of the digital broadcast information converting unit 20 with the front end 202 or the recording and reading unit 21 is changed over, the updated entitlement management message EMM can be reliably received in the digital information recording and reproducing apparatus 10 without any failure of the receiving of the message EMM even though a reproducing operation is performed in the apparatus 10.

Also, even though specific information added by the sender is included in the received digital broadcast signal as broadcast-watching enabling information, the specific information added by the sender is processed in the EMM extracting and deciphering unit 14 in the same manner as the entitlement management message EMM. Therefore, the broadcast-watching enabling information is represented by the entitlement management message EMM, so that the EMM extracting and deciphering unit 14 functions as a broadcast-watching enabling information extracting means.

In cases where the user desires to record a plurality of television programs transmitted from the digital broadcast sending system 100 (a receiving operation), the front end 202 is connected with the digital broadcast information converting unit 20 through a first terminal T1 of the switch 203, the received digital broadcast signal is transmitted to the digital broadcast information converting unit 20 through the switch 203. In the digital broadcast information converting unit 20, the received digital broadcast signal is sent to the packet extracting unit 11, the PMT extracting and analyzing unit 16 and the PAT extracting and analyzing unit 17.

In the PAT extracting and analyzing unit 17, packets of the program association table PAT are extracted from the packets of the received digital broadcast signal by detecting packet identifiers of the packets of the table PAT. For example, packet identifiers of the packets are set to "0". The program association table PAT is stored in the first area of the memory 22. Because a list of packet identifiers of packets corresponding to the program map table PMT is arranged in the program association table PAT, the program map table PMT can be extracted by analyzing the program association table PAT. Therefore, the packet identifiers of the packets of the program map table PMT are identified by the PAT extracting and analyzing unit 17 by analyzing the program association table PAT, and PAT information indicating the packet identifiers of the packets of the program map table PMT is sent to the PMT extracting and analyzing unit 16.

In the PMT extracting and analyzing unit 16, the packets of the program map table PMT are detected from the packets of the received digital broadcast signal according to the PAT information. In the program map table PMT, packet identifiers of packets of television programs and packet identifiers of packets of the entitlement control message ECM are listed. Therefore, packet identifiers of packets of one television program are identified for each television program by analyzing the program map table PMT, and program information indicating the packet identifiers of the packets of one television program is sent to the packet extracting unit 11 for each television program. Also, packet identifiers of packets of the entitlement control message ECM are identified by analyzing the program map table PMT, and PMT information indicating the packet identifiers of the packets of the entitlement control message ECM is sent to the ECM extracting and deciphering unit 15. The program map table PMT is stored in the second area of the memory 22.

In the ECM extracting and deciphering unit 15, packets of one entitlement control message ECM are extracted from the packets of the received digital broadcast signal according to the PMT information for each television program, and each entitlement control message ECM is deciphered by using the work key Kw of the updated entitlement management message EMM stored in the fourth area of the memory 22. Each entitlement control message ECM including the scramble key Ks is stored in the third area of the memory 22.

In the packet extracting unit 11, packets, in which digital video/audio signals of one piece of digital broadcast information corresponding to one television program and character data indicating characters to be displayed in the television program are arranged, are extracted from the packets of the received digital broadcast signal according to the program information for each television program.

Because digital video/audio signals of each digital broadcast information transmitted from the digital broadcast sending system 100 are scrambled in the scrambling unit 104, it is required to descramble each digital broadcast information according to the scramble key Ks. Therefore, the scramble key Ks is required. Each piece of digital broadcast information scrambled is called watch-unable digital information in the claims.

Because the scramble key Ks is included in the entitlement control message ECM, the scramble key Ks is read out from the third area of the memory 22 for each television program, and the video/audio signals of each television program and the character data are descrambled in the descrambling unit 12 by using the scramble key Ks of the entitlement control message ECM. Therefore, the descrambled digital video/audio signals of one piece of digital broadcast information and the descrambled character data are obtained as extracted digital broadcast information for each television program. Each piece of digital broadcast information descrambled is called watch-enabled digital information in the claims.

Also, in the PAT/PMT rewriting unit 18, the program map table PMT extracted in the PMT extracting and analyzing unit 16 is rewritten to a rewritten program map table PMT, in which a plurality of packet identifiers of packets of one television program are listed, for each television program, the program association table PAT extracted in the PAT extracting and analyzing unit 17 is rewritten to a rewritten program association table PAT, in which a plurality of packet identifiers of packets of one rewritten program map table PMT are listed, for each rewritten program map table PMT. Thereafter, the extracted digital broadcast information obtained in the descrambling unit 12, the rewritten program association table PAT and the rewritten program map table PMT are multiplexed in the multiplexing unit 13 to obtain a piece of multiplexed digital broadcast information for each television program. Each multiplexed digital broadcast information is recorded in the recording and reading unit 21.

Because the rewritten program association table PAT and the rewritten program map table PMT are recorded with the extracted digital broadcast information in the recording and reading unit 21, the extracted digital broadcast information with the rewritten program association table PAT and the rewritten program map table PMT can be processed in the digital broadcast information converting unit 20 in the same manner as the received digital broadcast signal when the user desires to reproduce the extracted digital broadcast information recorded in the unit 21.

After the receiving operation described above is completed in a preceding step, a reproducing operation of a current step is performed.

In detail, when the user desires to reproduce one or more particular television programs selected by the user, a reproducing operation is started, the recording and reading unit 21 is connected with the digital broadcast information converting unit 20 through a second terminal T2 of the switch 203, and the pieces of multiplexed digital broadcast information corresponding to the television programs are transmitted as a readout digital broadcast signal from the recording and reading unit 21 to the digital broadcast information converting unit 20 through the switch 203. In the digital broadcast information converting unit 20, the readout digital broadcast signal is sent to the packet extracting unit 11, the PMT extracting and analyzing unit 16 and the PAT extracting and analyzing unit 17.

In the PAT extracting and analyzing unit 17, the rewritten program association table PAT corresponding to each particular television program is extracted, and particular PAT information indicating packet identifiers of packets of a rewritten program map table PMT corresponding to each particular television program is sent to the PMT extracting and analyzing unit 16. In the unit 16, rewritten program map table PMT corresponding to each particular television program is extracted from the readout digital broadcast signal according to the particular PAT information, and particular program information indicating packet identifiers of packets of particular digital broadcast information corresponding to each particular television program is sent to the packet extracting unit 11. In the unit 11, the particular digital broadcast information corresponding to each particular television program is extracted from the readout digital broadcast signal according to the particular program information. The particular digital broadcast information is transmitted as an extracted digital broadcast information to the video/audio decoder 206 and is converted into an analog video signal and an analog audio signal indicating each particular television program. Thereafter, the analog video signal is converted into the NTSC signal or the PAL signal in the NTSC/PAL encoder 207, and the analog audio signal and the analog video signal converted into the NTSC signal or the PAL signal are output to a video/audio reproducing unit (not shown).

One or more reproducing operations and one receiving operation are performed as one step in that order each time the multiplexed digital broadcast signal is received in the antenna 201.

Accordingly, because the updated entitlement management message EMM can be reliably received in the digital information recording and reproducing apparatus 10 without any failure of the receiving of the message EMM even though a reproducing operation is performed in the apparatus 10, the work key Kw of the updated entitlement management message EMM is reliably detected and stored in the fourth area of the memory 22, each television program transmitted from the digital broadcast sending system 100 can be reliably reproduced in the digital information recording and reproducing apparatus 10, and the user can reliably entertain one or more television programs.

Next a direct reproducing operation is described in brief. When the user desires to directly reproduce one or more television programs transmitted from the digital broadcast sending system 100 without recording pieces of extracted digital broadcast information indicating the television programs in the recording and reading unit 21, the front end 202 is connected with the digital broadcast information converting unit 20 through the first terminal Ti of the switch 203 in the same manner as in the receiving operation, the received digital broadcast signal is transmitted to the digital broadcast information converting unit 20 through the switch 203. Thereafter, the received digital broadcast signal is converted into extracted digital broadcast information for each television program in the digital broadcast information converting unit 20 in the same manner as in the receiving operation, and the extracted digital broadcast information is processed in the video/audio decoder 206 and the NTSC/PAL encoder 207 in the same manner as in the reproducing operation.

Therefore, the user can entertain one or more television programs transmitted from the digital broadcast sending system 100 without recording the television programs.

In this embodiment, the ECM extracting and deciphering unit 15 is directly connected with the front end 202 to always receive the received digital broadcast signal transmitted from the front end 202. However, it is applicable that the ECM extracting and deciphering unit 15 be arranged in the digital broadcast information converting unit 20 to receive the received digital broadcast signal transmitted from the front end 202 through the switch 203 in the receiving operation.

Also, in this embodiment, the packet identifiers of the packets of each entitlement control message ECM are listed in the program map table PMT. However, it is applicable that the packet identifiers of the packets of each entitlement control message ECM be listed in the program association table PAT. In this case, PMT information indicating the packet identifiers of the packets of each entitlement control message ECM is sent from the PAT extracting and analyzing unit 17 to the ECM extracting and deciphering unit 15. Also, it is applicable that the packet identifiers of the packets of each entitlement control message ECM be set to a predetermined value. In this case, the packets of each entitlement control message ECM can be always extracted from the received digital broadcast signal without any PMT information.

Also, in this embodiment, the recording medium arranged in the recording and reading unit 21 is a magnetic tape. However, it is applicable that a magnetic disk or a photomagnetic disk be arranged in the recording and reading unit 21 in place of the magnetic tape.

Also, in this embodiment, the multiplexed digital broadcast signal transmitted from the digital broadcast sending system 100 is received in the antenna 201 and is processed in the front end 202 to produce a processed digital broadcast signal. However, the present invention is not limited to the multiplexed digital broadcast signal transmitted from the digital broadcast sending system 100. For example, in cases where the multiplexed digital broadcast signal is recorded in advance as a package soft in a storage medium such as a magnetic tape, it is applicable that the multiplexed digital broadcast signal recorded in a storage medium be read out form the storage medium and be sent to the front end 202. Also, in cases where the processed digital broadcast signal is recorded in advance as a package soft in a storage medium, it is applicable that the processed digital broadcast signal recorded in a storage medium be directly sent to the switch 203, the EMM extracting and deciphering unit 14 and the ECM extracting and deciphering unit 15.

Also, it is applicable that the recording and reading unit 21 be separated from the digital broadcast signal receiving apparatus. In this case, the recording and reading unit 21 is connected with the recording and reading unit 21 through a digital broadcast signal output terminal set to an output of the multiplexing unit 13 and a digital broadcast signal input terminal set to an input of the switch 203.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims:

What is claimed is:

1. A digital broadcast signal receiving apparatus for receiving a digital broadcast signal transmitted from a sender and outputting a watching signal derived from the digital broadcast signal, the digital broadcast signal containing watch-unable information which prevents the apparatus from outputting the watching signal and containing watch-enable information which enables the apparatus to output the watching signal, the apparatus comprising:

receiving means for receiving the digital broadcast signal from the sender;

signal processing means for processing an input signal supplied thereto responsive to the watch-enable information and outputting a processed signal;

selecting means operable in a first and second operating mode, for selecting the input signal to the signal processing means whereby an output signal of the receiving means is selected in said first operating mode, and a reproduced signal from an external source is selected in said second operating mode;

extracting means coupled directly to the receiving means bypassing said selecting means independent of the position of said selecting means for constantly extracting the watch-enable information from the digital broadcast signal received by the receiving means such that said signal processing means and said extracting means operate in both said first and second operating modes for producing the watching signal from the processed signal wherein said watch-enable information constantly extracted by the extracting means enables the signal processing means to unscramble said input signal thereto in both the first and second operating modes.

2. A digital broadcast signal receiving apparatus according to claim 1, in which the extracting means comprises:

EMM extracting means for extracting an entitlement management message EMM representing the watch-enable information from the digital broadcast signal, a work key being included in the entitlement management message EMM; and ECM extracting and deciphering means for extracting an enciphered entitlement control message ECM from the digital broadcast signal and for deciphering the enciphered entitlement control message ECM according to the work key to produce an entitlement control message ECM, a scramble key being included in the entitlement control message ECM, and the digital broadcast signal that is not watchable being converted into a watchable signal as the watching signal according to the scramble key of the entitlement control message ECM.

3. A digital broadcast signal receiving apparatus as claimed in claim 1, wherein the reproduced signal of the external source contains a scrambled signal, and the signal processing means comprises descrambling means for descrambling the scrambled signal using said watch-enable information.

4. A digital broadcast signal receiving apparatus according to claim 1, in which the external source is recording and reproducing means for recording the processed signal in said first operating mode and for producing the reproduced signal in said second operating mode.

5. A digital broadcast signal receiving apparatus according to claim 1, further comprising storing means for storing the watch-enable information and for outputting the watch-enable information stored therein to the signal processing means in said second operating mode.

6. A digital broadcast signal receiving apparatus according to claim 1, in which the digital broadcast signal is transmitted in a form of packets, and the signal processing means comprises packet extracting means, the packet extracting means extracts packets of digital broadcast information included in the digital broadcast signal supplied from the receiving means through the selecting means in the first operating mode, and the packet extracting means extracts packets of digital broadcast information included in the digital broadcast signal supplied from the external source through the selecting means in the second operating mode.

7. A digital information recording and reproducing apparatus for receiving a digital broadcast signal transmitted from a sender and outputting a watching signal derived from the digital broadcast signal, the digital broadcast signal containing watch-unable information which prevents the apparatus from outputting the watching signal and containing watch-enable information which enables the apparatus to output the watching signal, the apparatus comprising:

receiving means for receiving the digital broadcast signal from the sender;

signal processing means for processing an input signal supplied thereto responsive to the watch-enable information and outputting a processed signal;

recording and reproducing means for recording the processed signal and for reproducing a recorded signal from the recording and reproducing means;

selecting means, operable in a first and second operating mode, for selecting the input signal to the signal processing means, whereby an output signal of the receiving means is selected in said first operating mode, and the recorded signal from the recording and reproducing means is selected in said second operating mode;

extracting means coupled directly to the receiving means bypassing said selecting means independent of position of said selecting means for constantly extracting the watch-enable information from the digital broadcast signal received by the receiving means such that said signal processing means operates in both said first and second operating modes in response to the watching signal; and decoding means for producing and outputting the watching signal by decoding the processed signal, said watching signal being produced from the digital broadpast signal currently received by the receiving means in said first operating mode, and produced from the recorded signal reproduced from the recording and reproducing means in said second operating mode responsive to said watch-enable information wherein said watch-enable information constantly extracted by the extracting means enables the signal processing means to unscramble said input signal thereto in both the first and second operating modes.

8. A digital information recording and reproducing apparatus according to claim 7, in which the extracting means comprises:

EMM extracting means for extracting an entitlement management message EMM representing the watch-enable information from the digital broadcast signal, a work key being included in the entitlement management message EMM; and ECM extracting and deciphering means for extracting an enciphered entitlement control message ECM from the digital broadcast signal and for deciphering the enciphered entitlement control message ECM according to the work key to produce an entitlement control message ECM, a scramble key being included in the entitlement control message ECM, and the digital broadcast signal which is not watchable being converted into a watchable signal as the watching signal according to the scramble key of the entitlement control message ECM.

9. A digital information recording and reproducing apparatus according to claim 7, in which the digital broadcast signal which is not watchable is a television program, and the watching signal produced by the decoding means is composed of an analog video signal and an analog audio signal which constitute a particular television program desired by a user.

10. A digital information recording and reproducing apparatus according to claim 7, in which the recorded signal reproduced from the recording and reproducing means contains a scrambled signal, and the signal processing means comprises descrambling means for descrambling the scrambled signal using said watch-enable information.

11. A digital information recording and reproducing apparatus according to claim 7, further comprising storing means for storing the watch-enable information and outputting the watch-enable information stored therein to the signal processing means in said second operating mode.

12. A digital information recording and reproducing apparatus according to claim 7, in which the digital broadcast signal is transmitted in a form of packets, and the signal processing means comprises packet extracting means, the packet extracting means extracts packets of digital broadcast information included in the digital broadcast signal supplied from the receiving means through the selecting means in the first operating mode, and the packet extracting means extracts packets of digital broadcast information included in the processed signal supplied from the recording and reproducing means through the selecting means in the second operating mode.

13. A digital information recording and reproducing apparatus for receiving a digital broadcast signal transmitted from a sender and outputting a watching signal derived from the digital broadcast signal, the digital broadcast signal containing watch-unable information which prevents the apparatus from outputting the watching signal and containing watch-enable information which enables the apparatus to output the watching signal, the apparatus comprising:

receiving means for receiving the digital broadcast signal from the sender;

signal processing means for processing an input signal supplied thereto responsive to the watch-enable information and outputting a processed signal;

recording and reproducing means for recording the processed signal and for reproducing a recorded signal from the recording and reproducing means;

selecting means, operable in a first and second operating mode, for selecting the input signal to the signal processing means, whereby an output signal of the receiving means is selected in said first operating mode, and the recorded signal from the recording and reproducing means is selected in said second operating mode;

extracting means coupled directly to the receiving means bypassing said selecting means for constantly extracting the watch-enable information from the digital broadcast signal received by the receiving means; and storing means for storing the watch-enable information, the watching signal is being produced from the digital broadcast signal currently received by the receiving means in said first operating mode, and produced from the recorded signal reproduced from the recording and reproducing means in said second operating mode responsive to the watch-enable information stored in the storing means wherein said watch-enable information constantly extracted by the extracting means enables the signal processing means to unscramble said input signal thereto in both the first and second operating modes.

14. A digital information recording and reproducing apparatus according to claim 13, in which the digital broadcast signal is transmitted in a form of packets, and the signal processing means comprises packet extracting means, the packet extracting means extracts packets of digital broadcast information included in the digital broadcast signal supplied from the receiving means through the selecting means in the first operating mode, and the packet extracting means extracts packets of digital broadcast information included in the processed signal supplied from the recording and reproducing means through the selecting means in the second operating mode.

15. A digital broadcast signal receiving apparatus for receiving a digital broadcast signal transmitted from a sender and outputting a watching signal derived from the digital broadcast signal, the digital broadcast signal containing watch-unable information which prevents the apparatus from outputting the watching signal and containing watch-enable information which enables the apparatus to output the watching signal, the apparatus comprising;

input terminal means and output terminal means;

receiving means for receiving the digital broadcast signal from the sender;

signal processing means for processing an input signal supplied thereto responsive to the watch-enable information and outputting a processed signal to the output terminal means;

selecting means, operable in a first and second operating mode, for selecting the input signal of the signal processing means, whereby an output signal of the receiving means is selected in said first operating mode, and a signal inputted to the input terminal means is selected in said second operating mode;

extracting means coupled directly to the receiving means bypassing said selecting means for constantly extracting the watch-enable information from the digital broadcast signal received by the receiving means; and storing means for storing the watch-enable information, the watching signal being produced from the digital broadcast signal currently received by the receiving means in said first operating mode, and produced from the signal inputted to the input terminal means in said second operating mode responsive to the watch-enable information stored in the storing means wherein said watch-enable information constantly extracted by the extracting means enables the signal processing means to unscramble said input signal thereto in both the first and second operating modes.

16. A digital broadcast signal receiving apparatus according to claim 15, in which the digital broadcast signal is transmitted in a form of packets, and the signal processing means comprises packet extracting means, the packet extracting means extracts packets of digital broadcast information included in the digital broadcast signal supplied from the receiving means through the selecting means in the first operating mode, and the packet extracting means extracts packets of digital broadcast information included in the digital broadcast signal supplied to the input terminal means of the selecting means in the second operating mode.

17. A digital information recording and reproducing apparatus for receiving a digital broadcast signal transmitted from a sender and outputting a watching signal derived from the digital broadcast signal, the digital broadcast signal containing watch-unable information which prevents the apparatus from outputting the watching signal and containing a watch-enable information which enables the apparatus to output the watching signal, the apparatus comprising;

receiving means for receiving the digital broadcast signal from the sender;

signal processing means for processing an input signal supplied thereto responsive to the watch-enable information and outputting a processed signal;

recording and reproducing means for recording the processed signal and for reproducing a recorded signal from the recording and reproducing means;

selecting means, operable in a first and second operating mode, for selecting the input signal to the signal processing means, whereby an output signal of the receiving means is selected in said first operating mode, and the recorded signal from the recording and reproducing means is selected in said second operating mode;

extracting means coupled directly to the receiving means bypassing said selecting means for constantly extracting the watch-enable information from the digital broadcast signal received by the receiving means; and storing means for storing the watch-enable information, wherein the watch-enable information is stored in the storing means in said first operating mode, and is read out from the storing means in said second operating mode for processing the input signal supplied to the signal processing means wherein said watch-enable information constantly extracted by the extracting means enables the signal processing means to unscramble said input signal thereto in both the first and second operating modes.

18. A digital information recording and reproducing apparatus according to claim 12, in which the digital broadcast signal is transmitted in a form of packets, and the signal processing means comprises packet extracting means, the packet extracting means extracts packets of digital broadcast information included in the digital broadcast signal supplied from the receiving means through the selecting means in the first operating mode, and the packet extracting means extracts packets of digital broadcast information included in the processed signal supplied from the recording and reproducing means through the selecting means in the second operating mode.

19. A digital broadcast signal receiving apparatus for receiving a digital broadcast signal transmitted from a sender and outputting a watching signal derived from the digital broadcast signal, the digital broadcast signal containing, watch-unable information which prevents the apparatus from outputting the watching signal and containing watch-enable information which enables the apparatus to output the watching signal, the apparatus comprising.

input terminal means and output terminal means;

receiving means for receiving the digital broadcast signal from the sender;

signal processing means for processing an input signal supplied thereto responsive to the watch-enable information and outputting a processed signal to the output terminal means;

selecting means, operable in a first and second operating mode, for selecting the input signal of the signal processing means, whereby an output signal of the receiving means is selected in said first operating mode, and a signal inputted to the input terminal means is selected in said second operating mode;

extracting means coupled directly to the receiving means bypassing said selecting means for constantly extracting the watch-enable information from the digital broadcast signal received by the receiving means; and storing means for storing the watch-enable information, wherein the watch, enable information is stored in the storing means in said first operating mode, and is read out from the storing means in the second operating mode for processing the input signal supplied to the signal processing means wherein said watch-enable information constantly extracted by the extracting means enables the signal processing means to unscramble said input signal thereto in both the first and second operating modes.

20. A digital broadcast signal receiving apparatus according to claim 19, in which the digital broadcast signal is transmitted in a form of packets, and the signal processing means comprises packet extracting means, the packet extracting means extracts packets of digital broadcast information included in the digital broadcast signal supplied from the receiving means through the selecting means in the first operating mode, and the packet extracting means extracts packets of digital broadcast information included in the digital broadcast signal supplied to the input terminal means of the selecting means in the second operating mode.

* * * * *